(12) United States Patent
Schneider

(10) Patent No.: US 10,859,451 B2
(45) Date of Patent: Dec. 8, 2020

(54) PRISM COUPLING METHODS OF CHARACTERIZING STRESS IN GLASS-BASED ION-EXCHANGED ARTICLES HAVING PROBLEMATIC REFRACTIVE INDEX PROFILES

(71) Applicant: CORNING INCORPORATED, Corning, NY (US)

(72) Inventor: Vitor Marino Schneider, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 103 days.

(21) Appl. No.: 16/289,874

(22) Filed: Mar. 1, 2019

(65) Prior Publication Data

US 2019/0271602 A1    Sep. 5, 2019

Related U.S. Application Data

(60) Provisional application No. 62/637,679, filed on Mar. 2, 2018.

(51) Int. Cl.
*G01L 1/00* (2006.01)
*G01L 1/24* (2006.01)
(Continued)

(52) U.S. Cl.
CPC ............ *G01L 1/24* (2013.01); *C03C 21/002* (2013.01); *C03C 21/005* (2013.01); *G01B 5/04* (2013.01);
(Continued)

(58) Field of Classification Search
CPC ....... G01L 1/24; C03C 21/002; C03C 21/005; G01B 5/04; G01B 11/0641; G01B 11/22;
(Continued)

(56) References Cited

U.S. PATENT DOCUMENTS 9,140,054 B2    9/2015  Oberbroeckling
9,140,543 B1    9/2015  Allan et al.
(Continued)

FOREIGN PATENT DOCUMENTS

CN    205120285 U    3/2016
JP    2016024002 A    2/2016

OTHER PUBLICATIONS

International Search Report and Written Opinion PCT/US2019/020282 dated May 24, 2019, 17 Pgs.

*Primary Examiner* — Max H Noori
(74) *Attorney, Agent, or Firm* — Kevin M. Johnson

(57) ABSTRACT

The prism coupling methods disclosed herein are directed to determining a stress characteristic of an original IOX article having a buried IOX region with a buried refractive index profile that is problematic in the sense that it prevents the original IOX article from being measured using a prism coupler system. The methods include modifying the buried IOX region of the original IOX article in a surface portion of the buried IOX region to form a modified IOX article having an unburied refractive index profile that allows the modified IOX article to be measured using a prism coupler. The methods also include measuring a mode spectrum of the modified IOX article using the prism coupler system. The methods further include determining one or more stress characteristic of the original IOX article from the mode spectrum of the modified IOX article.

33 Claims, 13 Drawing Sheets

(51) Int. Cl.
| | |
|---|---|
| *G01M 11/08* | (2006.01) |
| *G02B 6/34* | (2006.01) |
| *C03C 21/00* | (2006.01) |
| *G02B 6/14* | (2006.01) |
| *G02B 6/36* | (2006.01) |
| *G01B 5/04* | (2006.01) |
| *G02B 6/134* | (2006.01) |
| *G01B 11/06* | (2006.01) |
| *G01B 11/22* | (2006.01) |
| *G01M 11/00* | (2006.01) |
| *G01N 21/41* | (2006.01) |
| *G01N 21/21* | (2006.01) |

(52) U.S. Cl.
CPC .......... *G01B 11/0641* (2013.01); *G01B 11/22* (2013.01); *G01M 11/08* (2013.01); *G02B 6/1345* (2013.01); *G02B 6/14* (2013.01); *G02B 6/34* (2013.01); *G02B 6/362* (2013.01); *G01N 21/21* (2013.01); *G01N 2021/4126* (2013.01)

(58) Field of Classification Search
CPC ....... G01M 11/08; G02B 6/1345; G02B 6/14; G02B 6/34; G02B 6/362; G01N 21/21; G01N 2021/4126
USPC .......................................................... 73/800
See application file for complete search history.

(56) References Cited

U.S. PATENT DOCUMENTS

| | | | |
|---|---|---|---|
| 9,534,981 B2* | 1/2017 | Roussev | ................ G01N 21/41 |
| 10,495,530 B2* | 12/2019 | Liu | ............................ G01L 1/24 |
| 2014/0368808 A1 | 12/2014 | Roussev et al. | |
| 2015/0329413 A1* | 11/2015 | Beall | ...................... C03B 32/02 501/32 |

* cited by examiner

PRISM COUPLING METHODS OF CHARACTERIZING STRESS IN GLASS-BASED ION-EXCHANGED ARTICLES HAVING PROBLEMATIC REFRACTIVE INDEX PROFILES

CROSS-REFERENCE TO RELATED APPLICATIONS

This application claims the benefit of priority under 35 U.S.C. § 119 of U.S. Provisional Application Ser. No. 62/637,679 filed on Mar. 2, 2018, the content of which is relied upon and incorporated herein by reference in its entirety.

FIELD

The present disclosure relates to glass-based ion-exchanged (IOX) articles, and in particular to prism coupling methods of characterizing stress in glass-based IOX articles where the refractive index profile is problematic in that it prevents the conventional application of prism coupling measurement methods to characterize stress.

BACKGROUND

Chemically strengthened glass-based articles are formed by subjecting glass-based substrates to a chemical modification to improve at least one strength-related characteristic, such as hardness, resistance to fracture, etc. Chemically strengthened glass-based articles have found particular use as cover glasses for display-based electronic devices, especially hand-held devices such as smart phones and tablets.

In one method, the chemical strengthening is achieved by an IOX process whereby ions in the matrix of a glass-based substrate are replaced by externally introduced (i.e., replacement or in-diffused) ions, e.g., from a molten bath. The strengthening generally occurs when the replacement ions are larger than the native (or out-diffused) ions (e.g., $Na^+$ ions replaced by K ions). The IOX process gives rise to an IOX region in the glass that extends from the article surface into the matrix. The IOX region defines within the matrix a refractive index profile having a depth of layer (DOL) that represents a size, thickness or "deepness" of the IOX region as measured relative to the article surface. The refractive index profile also defines stress-related characteristics, including a stress profile, a surface stress, a depth of compression, a center tension, a birefringence, etc. The refractive index profile can also define in the glass-based article an optical waveguide that supports a number m of guided modes for light of a given wavelength when the refractive index profile meets certain criteria.

Prism coupling methods can be used to measure the spectrum of the guided modes of the planar optical waveguide formed in the glass-based IOX article to characterize one or more properties of the IOX region, such as the refractive index profile and the aforementioned stress-related characteristics. This technique has been used to measure properties of glass-based IOX articles used for a variety of applications, such as for chemically strengthened covers for displays (e.g., for smart phones). Such measurements are used to ensure that the IOX region has the intended characteristics and falls within the select design tolerances for each of the selected characteristics for the given application.

While prism coupling methods can be used for many types of conventional glass-based IOX articles, such methods do not work as well and sometimes do not work at all on certain glass-based IOX articles, such as those having buried refractive index profiles that make optical coupling to the IOX waveguide problematic. In one case, a buried refractive index profile with a large depth of layer supports a large number m (e.g., m>100) of waveguide modes, which can blur the resolution of the prism coupler measurement system. Meanwhile, even a relatively small refractive index difference $\Delta n_s = n_1 - n_s$ in the near-surface portion of the IOX region (where $n_1$ is the maximum refractive index $n_1$ and $n_s$ is the surface refractive index, and where $n_1 < n_s$) can limit the ability of the prism coupling system to couple light into the deep portion of the IOX region, which prevents the measurement of one or more select stress-related properties over the entire IOX region.

SUMMARY

An embodiment of the disclosure is a method of determining at least one stress characteristic of an original IOX article having a surface and a buried IOX region having a buried refractive index profile that prevents the original IOX article from being measured using a prism coupler system. The method comprises: a) modifying the buried IOX region of the original IOX article in a surface portion of the buried IOX region to form a modified IOX article having an unburied refractive index profile that allows the modified IOX article to be measured using a prism coupler; b) measuring a mode spectrum of the modified IOX article using the prism coupler system; and c) determining the at least one stress characteristic of the original IOX article from the mode spectrum of the modified IOX article. In some embodiments, the buried IOX region may be modified substantially only in the surface portion.

Another embodiment of the disclosure is a method of determining at least a surface stress CS of an IOX article having a surface and a buried IOX region having a buried refractive index profile that prevents the IOX article from being measured using a prism coupler system. The method comprises: a) modifying the buried IOX region in a surface portion of the buried IOX region by performing a modifying IOX process while leaving a deep portion of the buried IOX region substantially unchanged to define an unburied refractive index profile having a modified surface stress CS' different than the surface stress CS but that allows the IOX article to be measured using a prism coupler; b) measuring a compressive stress profile of the IOX article as modified in a) using the prism coupler system; and c) extrapolating the measured stress profile for the deep portion of the buried IOX region to the surface of the IOX article to determine the surface stress CS.

Another aspect of the disclosure is a quality control method for making an IOX article having a surface and a buried IOX region having a buried refractive index profile that prevents the IOX article from being measured using a prism coupler system. The method comprises: a) selecting the IOX article from a set of IOX articles formed using a common IOX process; b) modifying the buried IOX region of the selected IOX article in a surface portion of the buried IOX region to define an unburied refractive index profile that allows the IOX article to be measured using the prism coupler; c) measuring a mode spectrum of the selected IOX article as modified in b) using the prism coupler system; d) determining from the mode spectrum at least one stress characteristic of the selected IOX article as modified in b); and e) comparing the determined at least one stress characteristic to at least one of a target value and a tolerance for the at least one stress characteristic. In some embodiments, the buried IOX region may be modified substantially only in the surface portion.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The acronym IOX can mean either "ion exchange" or "ion exchanged," depending on the context of the discussion.

The term "glass based" is used herein to describe a material, article, matrix, substrate, etc., means that the material, article, matrix, material, substrate, etc. can comprise or consist of either a glass or a glass ceramic.

The compressive stress profile for an original IOX article is denoted CS(x) and is also referred to herein as just the stress profile. The surface compressive stress or just "surface stress" for the stress profile is denoted CS and is the value of the compressive stress profile CS(x) for x=0, i.e., CS=CS(0), where x=0 corresponds to the surface of the IOX article.

The compressive stress profile for a modified IOX article is denoted CS'(x) and is also referred to as just the modified stress profile. The surface compressive stress or just "surface stress" for the modified stress profile is denoted CS' and is the value of the modified compressive stress profile CS'(x) for x=0, i.e., CS'=CS'(0).

The depth of compression DOC is the x distance into the IOX article as measured from the surface of the IOX article to where the compressive stress CS(x) or CS'(x) crosses zero.

The term "IOX region" means a volume within a glass-based matrix where an IOX process has taken place to form the IOX article. A buried IOX region means that the maximum refractive index resides below the surface of the IOX article. A buried IOX region is considered herein to extend into the IOX article from the surface through which the IOX process was carried out and down to a depth of layer at which the refractive index profile transitions to the bulk index of the glass-based matrix.

The terms "surface portion" and "deep portion" are used below, depending on the context of the discussion, to respectively describe near-surface and far-from-surface sub-sections of: i) an original or a modified IOX article; ii) an original or modified IOX region, and iii) an original or modified refractive index profile.

The claims as set forth below are incorporated into and constitute part of this Detailed Description.

Cartesian coordinates are shown in some of the Figures for the sake of reference and are not intended to be limiting as to direction or orientation.

Original IOX Article

Figure 1:
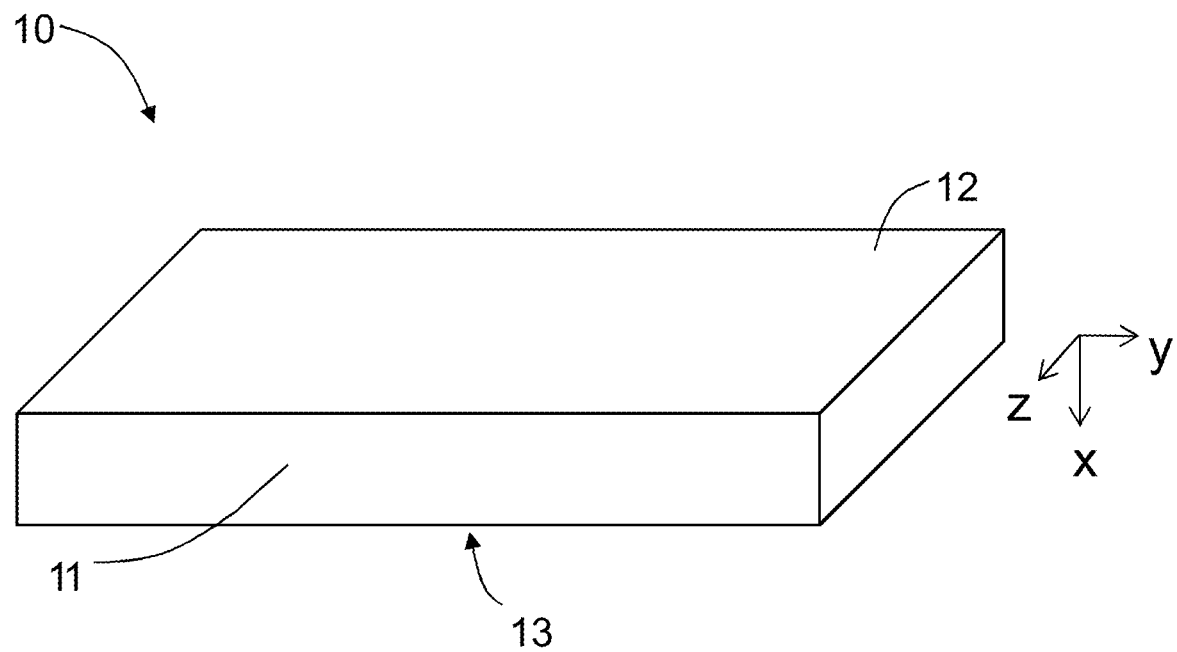
FIG. 1 is an elevated view of an example IOX article.

FIG. 1 is an elevated view an example IOX article 10 defined by a glass-based matrix 11 of a glass-based substrate 13. The IOX article 10 has a surface 12 and a thickness. In an example, the thickness is substantially constant and can be in the range from 50 microns (e.g., display screen protectors) to 2000 microns (e.g., automotive glass windshields). In some examples, the IOX article 10 (and the modified IOX article formed therefrom, as described below) is frangible while in other examples, it is non-frangible, according to the frangibility criteria set forth below.

Figure 2A:
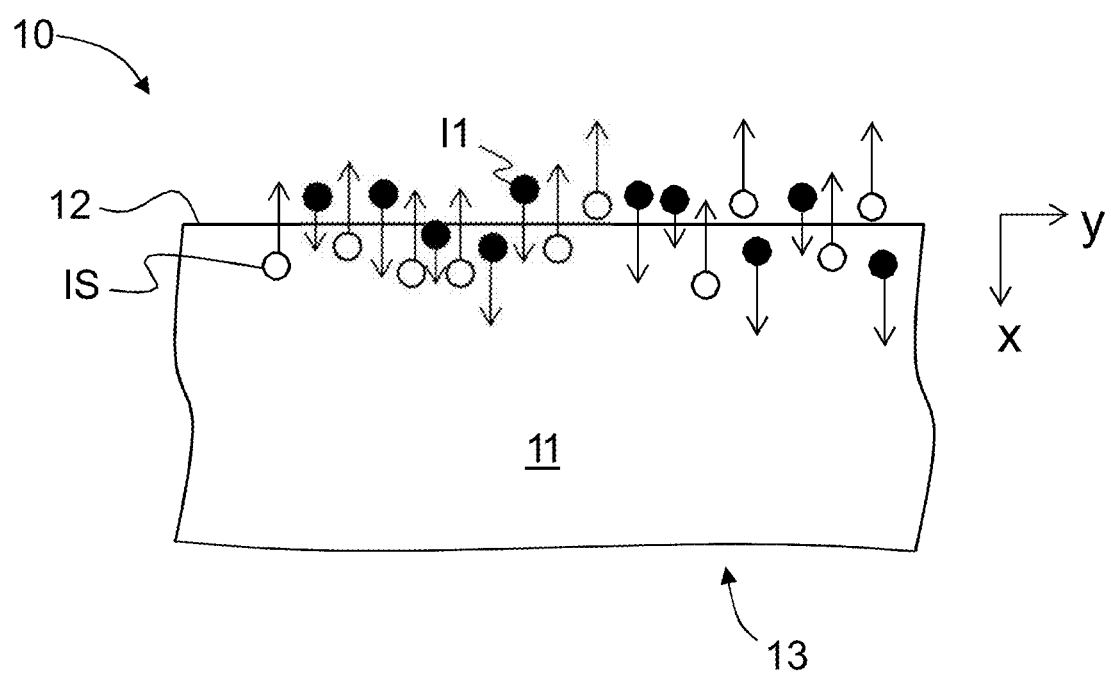
FIG. 2A is a close-up cross-sectional view of the IOX article of FIG. 1 illustrating an example initial IOX process used to form the initial IOX article.

FIG. 2A is a close-up cross-sectional view of the IOX article 10 as taken in the x-y plane and illustrates an example IOX process that takes place across the surface 12 and into the glass-based matrix 11 in the x-direction. The IOX article 10 includes matrix ions (i.e., native or out-diffusing ions) IS in the glass-based matrix 11 that exchange for the larger replacement or in-diffusing ions I1. The in-diffusing ions I1 can be introduced into the glass-based matrix 11 using known IOX techniques. For example, the in-diffusing ions I1 can be $K^+$ ions introduced via a $KNO_3$ bath while the matrix ions IS can be $Na^+$ or $Li^+$, depending on the glass-based material of the substrate used to form the IOX article 10. Two example glass-based materials suitable for forming the IOX article 10 are aluminosilicate glass and borosilicate glass.

The IOX process is carried out in the glass-based substrate to form the chemically strengthened IOX article 10. The IOX article 10 is also referred to below as the original IOX article since it is subsequently used to form a modified IOX article 10', as explained below. Example IOX articles 10 were formed using long diffusion times of about 100 hours in 100% $KNO_3$ and were found to be highly frangible, as were the modified IOX articles 10' formed therefrom.

The chemical strengthening of the glass-based substrate 13 to form the IOX article 10 occurs due to the stress added to the glass-based matrix 11 by the replacement or in-diffusing ions I1 being larger than the native or out-diffusing ions IS. In one example where the glass-based matrix 11 of the IOX article 10 contains Na, the IOX process for forming the IOX article 10 is a $K^+$—$Na^+$ process whereby the smaller $Na^+$ native or out-diffusing ions IS are replaced with the larger $K^+$ replacement or in-diffusing ions I1. In another example where the glass-based matrix 11 of the IOX article 10 contains Li, the IOX process for forming the IOX article 10 is a $K^+$—$Li^+$ process whereby the smaller $Li^+$ native or out-diffusing ions IS are replaced with the larger $K^+$ replacement or in-diffusing ions I1.

Figure 2B:
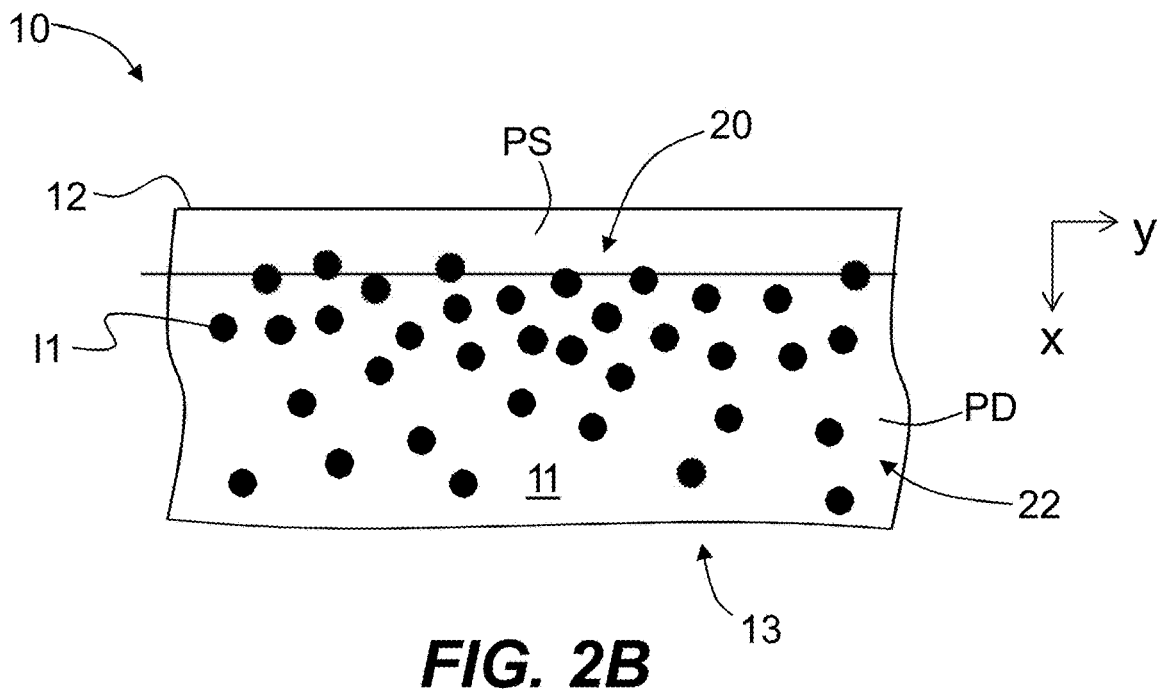
FIG. 2B is the close-up cross-sectional view of FIG. 2A showing the resulting buried IOX region formed by the initial IOX process, wherein the buried IOX region has a surface portion and a deep portion.
Figure 2C:
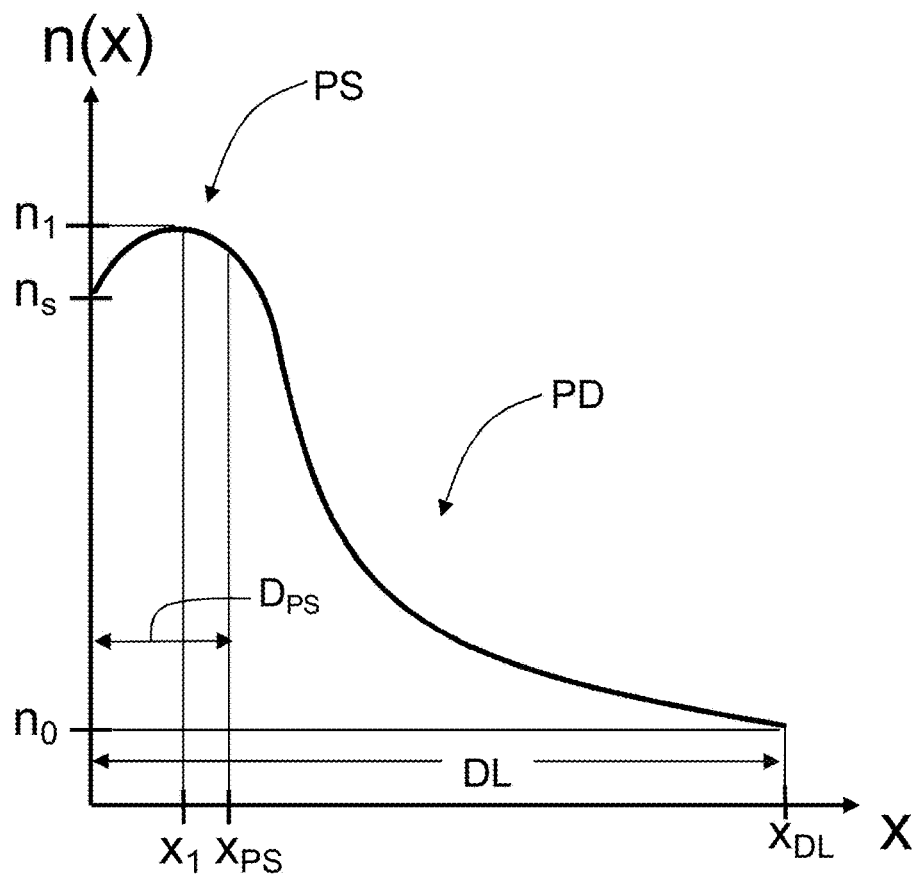
FIG. 2C is a plot of refractive index n(x) versus position (depth)×(relative units) illustrating an example buried refractive index profile for the buried IOX region of FIG. 2B showing the surface portion and the deep portion, wherein the maximum refractive index resides below the surface in the surface portion, and wherein the buried refractive index profile is problematic in that it prevents the IOX article from being measured using a prism coupler measurement system.

FIG. 2B is similar to FIG. 2A and schematically illustrates the result of the example IOX process of FIG. 2A that forms an IOX region 20 of the IOX article 10. FIG. 2C is a plot of the refractive index profile n(x) vs x of the IOX region 20 of the IOX article 10. The bulk refractive index of the glass-based matrix 11 is no, the refractive index at the surface 12 of the glass IOX article 10 is $n_s$, and the maximum refractive index is $n_1$. In the refractive index profile n(x), $n_1 > n_s > n_0$, with the maximum refractive index $n_1$ occurring below the surface 12 (x=0) at a depth $x_1$. The depth of layer DL occurs at the distance $x=x_{DL}$ and represents the depth at which the refractive index profile n(x) transitions to the bulk index no. In an example, the depth of layer DL is relatively large, e.g., greater than 100 microns or even greater than 150 microns or even greater than 200 microns.

The IOX region 20 and its corresponding refractive index profile n(x) has a surface portion PS and a deep portion PD. The surface portion PS can be characterized by a surface-portion refractive index difference $\Delta n_{PS} = n_1 - n_s$, which in an example can be in the range $1 \times 10^{-6} \leq \Delta n_{PS} \leq 1 \times 10^{-1}$. In an example, the surface portion PS extends into the IOX article 10 from the surface 12 to a surface-portion distance $x=x_{PS}$ to define a surface-portion depth $D_{PS}$. In an example, the surface-portion distance $x_{PS}$ is about the same as the distance $x_1$, and in particular can be in the range from about 10 microns to 50 microns. In an example, the surface-portion depth $D_{PS}$ can be in the range $(0.05) \cdot DL \leq D_{PS} \leq (0.5) \cdot DL$. The deep portion PD of the IOX region extends from the surface-portion distance $x=x_{PS}$ to the depth of layer distance $x_{DL}$.

The IOX region 20 is referred to as being "buried" because the maximum refractive index $n_1$ occurs below the surface 12 of the IOX article 10. This configuration for the IOX region 20 can occur by carrying out a relatively lengthy IOX process or by an IOX process where the source of the replacement or in-diffusing ions I1 is removed while the diffusion process continues at an elevated temperature. A buried IOX region 20 can also be formed using an IOX process with multiple steps or multiple types of in-diffusing ions, and/or by using the assistance of an external electric field to perform what is referred to in the art as a field-assisted IOX process. Non-linear diffusion effects can also result in or contribute to the formation of the buried IOX region 20.

The IOX article 10 is usually formed to have one or more select stress characteristics that correspond to desired or select amount of chemical strengthening. The select stress characteristics can include a particular stress profile CS(x) with a select amount of surface stress CS=CS(0), a maximum amount of birefringence, etc. To have confidence that the IOX process used to form the IOX article 10 imparted the desired stress characteristics to with manufacturing and performance tolerances, a measurement of at least one of the stress characteristics is required.

A common way of performing a measurement of a stress characteristic in an IOX article is by using prism coupling methods carried out on a prism coupling system. An example of a commercially available prism coupling system is the Model FSM-6000LE Surface Stress Meter, available from Orihara, Co. Ltd., Tokyo, Japan. Prism coupling systems rely on coupling light into the guided modes of an IOX waveguide 22 defined by the IOX region 20 and the immediately surrounding portion of the glass-based matrix 11 (see FIG. 2B). The mode spectrum (fringes) for the transverse electric (TE) and transverse magnetic (TM) guided modes are electronically (e.g., digitally) captured and then processed using know techniques to obtain a measurement of one or more stress characteristics, such as the stress profile, the surface stress, birefringence, depth of layer DL, depth of compression DOC, center tension, etc.

The FSM-6000LE Surface Stress Meter calculates only the surface compressive stress CS from the effective indices of the first two transverse magnetic (TM) guided modes and the first two transverse electric (TE) guided modes. The total number of observed modes is used, along with the bulk index no and the aforementioned effective indices of the first 2 modes, to calculate the depth of layer DL based on a linear refractive-index profile assumption.

U.S. Pat. No. 9,140,543, which is incorporated by reference herein, discloses an example prism coupling system and more sophisticated inverse Wentzel-Kramers-Brilloun (WKB) methods for processing the TE and TM mode spectra to infer the (compressive) stress profile CS(x) and other stress characteristics of an IOX article. Such prism coupling systems and methods are discussed in greater detail below.

Prism Coupling System

Figure 3A:
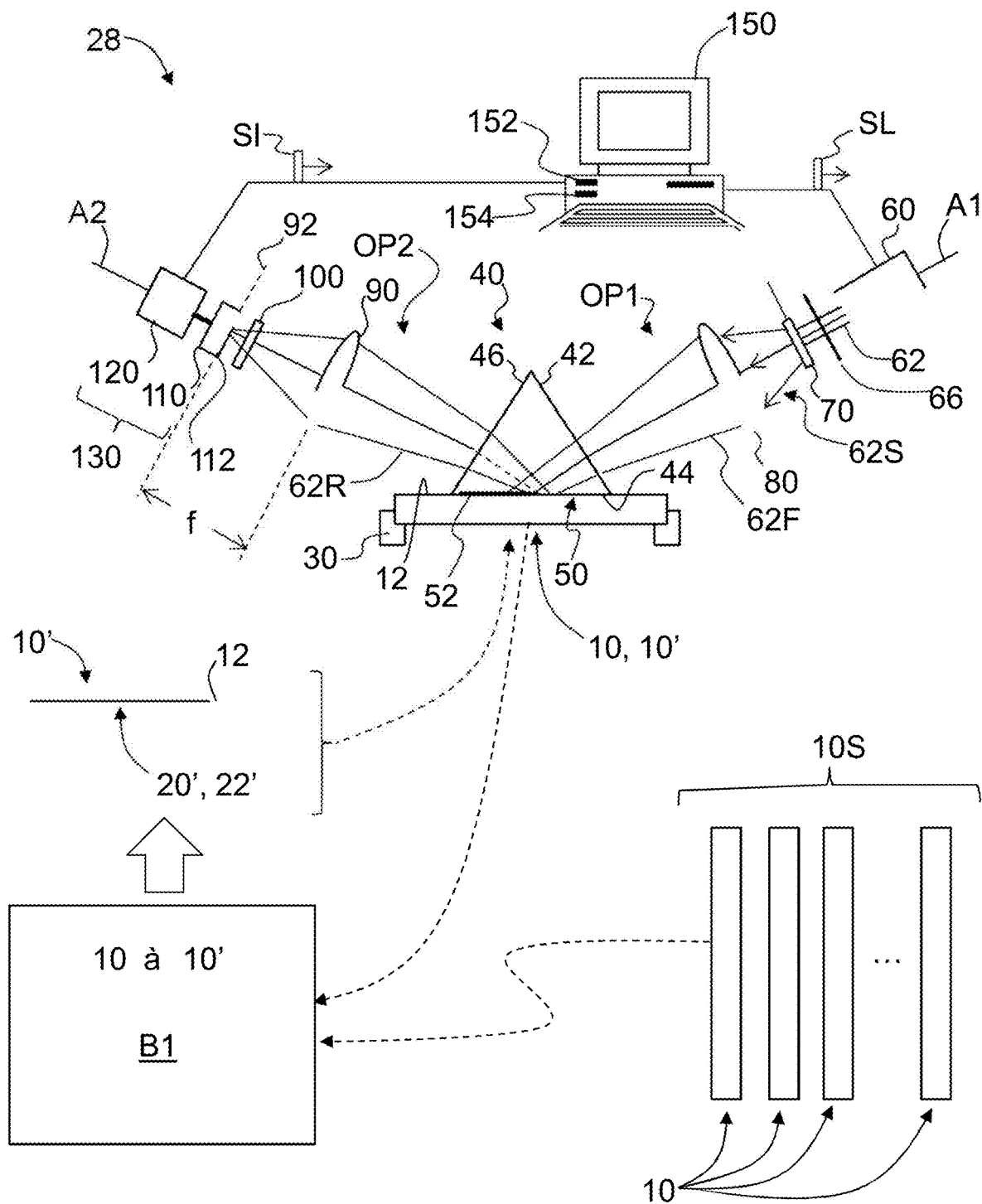
FIG. 3A is a schematic diagram of an example prism coupling system used to measure the mode spectrum of an IOX waveguide formed by the IOX region, wherein the mode spectrum is used to calculate an amount of surface stress or a stress profile.

FIG. 3A is a schematic diagram of an example prism coupling system 28 that can be used to carry out aspects of the methods disclosed herein. The prism coupling methods using the prism coupling system 28 are non-destructive. This feature is particularly useful for measuring frangible IOX articles for research and development purposes and for quality control in manufacturing.

The prism coupling system 28 includes a support stage 30 configured to operably support the IOX article 10, as well as the modified IOX article 10' introduced and discussed in greater detail below. The prism coupling system 28 also includes a coupling prism 40 that has an input surface 42, a coupling surface 44 and an output surface 46. The coupling prism 40 has a refractive index $n_p > n_0$. The coupling prism 40 is interfaced with IOX article being measured by bringing coupling-prism coupling surface 44 and the surface 12 into optical contact, thereby defining an interface 50 that in an example can include an interfacing fluid 52.

The prism coupling system 28 includes optical axes A1 and A2 that respectively pass through the input and output surfaces 42 and 46 of the coupling prism 40 to generally converge at the interface 50 after accounting for refraction at the prism/air interfaces. The prism coupling system 28 includes, in order along axis A1, a light source 60 that emits measuring light 62 of wavelength λ, an optional optical filter 66 that may be alternatively included in the detector path on axis A2, an optional light-scattering element 70 that forms scattered light 62S, and an optional focusing optical system 80 that forms focused (measuring) light 62F, as explained below. Thus, in an example of the prism coupling system 28, there are no optical elements between light source 60 and prism input surface 42.

The prism coupling system 28 also includes, in order along the axis A2 from the coupling prism 40, a collection optical system 90 having a focal plane 92 and a focal length f and that receives reflected light 62R as explained below, a TM/TE polarizer 100, and a photodetector system 130. The axis A1 defines the center of an optical path OP1 between the light source 60 and the coupling surface 44. The axis A2 defines the center of an optical path OP2 between the coupling surface 44 and the photodetector system 130. Note that the axes A1 and A2 may be bent at the input and output surfaces 42 and 46, respectively, due to refraction. They may also be broken into sub-paths by inserting mirrors (not shown) into the optical paths OP1 and/or OP2.

Figure 3B:
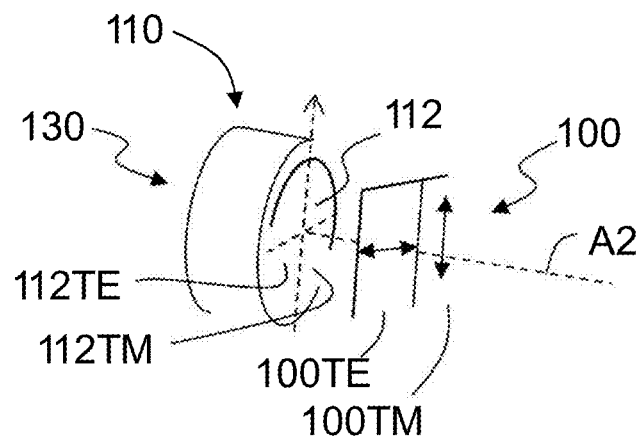
FIG. 3B is a close-up view of the photodetector system of the prism coupling system of FIG. 3A.

In an example, the photodetector system 130 includes a detector (camera) 110 and a frame grabber 120. In other embodiments discussed below, the photodetector system 130 includes a CMOS or CCD camera. FIG. 3B is a close-up elevated view of the TM/TE polarizer 100 and the detector 110 of the photodetector system 130. In an example, the TM/TE polarizer includes a TM section 100TM and a TE section 100TE. The photodetector system 130 includes a photosensitive surface 112. The photosensitive surface 112 resides in the focal plane 92 of the collecting optical system 90, with the photosensitive surface being generally perpendicular to the axis A2. This serves to convert the angular distribution of the reflected light 62R exiting the coupling prism output surface 46 to a transverse spatial distribution of light at the sensor plane of the camera 110. In an example embodiment, the photosensitive surface 112 comprises pixels, i.e., the detector 110 is a digital detector, e.g., a digital camera.

Figure 3C:
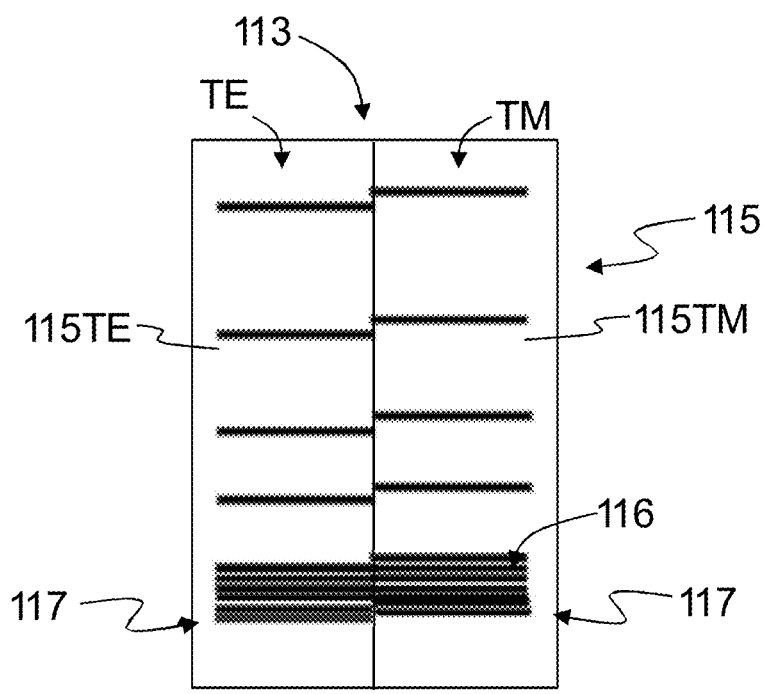
FIG. 3C is a schematic diagram of an example mode spectrum as detected by the photodetector system of FIG. 3B and that includes a transverse electric (TE) mode spectrum with TE fringes and a transverse magnetic (TM) mode spectrum with TM fringes, wherein the mode spectrum has a total-internal-reflection (TIR) section and a non-TIR section that define a TIR boundary.

Splitting the photosensitive surface 112 into TE and TM sections 112TE and 112TM as shown in FIG. 3B allows for the simultaneous recording of digital images of the angular reflection spectrum (mode spectrum) 113, which includes the TE and TM polarizations of the reflected light 62R. This simultaneous detection eliminates a source of measurement noise that could arise from making the TE and TM measurements at different times, given that system parameters can drift with time. FIG. 3C is a schematic representation of a mode spectrum 113 as captured by the photodetector system 130. The mode spectrum 113 has total-internal-reflection (TIR) section 115 associated with guided modes and a non-TIR section 117 associated with radiation modes and leaky modes. The mode spectrum 113 has TM and TE regions that include respective spectral lines (fringes) 115TM and 115TE. The stress characteristics are calculated based on the difference in positions of the fringes 115TM and 115TE in the mode spectrum 113. At least two fringes 115TM for the TM mode spectrum and at least two fringes 115TE for the TE mode spectrum are needed to calculate the surface stress CS. Additional fringes are needed to calculate the stress profile CS(x).

The prism coupling system 28 includes a controller 150, which is configured to control the operation of the prism coupling system. The controller 150 is also configured to receive and process from the photodetector system 130 image signals SI representative of captured (detected) TE and TM mode spectra images. The controller 150 includes a processor 152 and a memory unit ("memory") 154. The controller 150 may control the activation and operation of the light source 60 via a light-source control signal SL, and receives and processes image signals SI from the photodetector system 130 (e.g., from the frame grabber 120, as shown). The controller 150 is programmable to perform the functions described herein, including the operation of the prism coupling system 28 and the aforementioned signal processing of the image signals SI to arrive at a measurement of one or more of the aforementioned stress characteristics of the IOX article 10.

A proper measurement of a stress characteristic of the IOX article 10 conventionally requires that the prism coupling system 28 couple the light 62F into a sufficient number of the guided modes supported by the IOX waveguide 22 so that most if not all of the refractive index profile is sampled when forming the mode spectrum 113. This can occur when the refractive index profile has a maximum at the surface 12 of the IOX article (so that $n_1=n_s$) and that decreases with distance x into the glass-based matrix 11.

Unfortunately, the buried IOX region 20 having the buried refractive index profile n(x) as discussed above in connection with FIGS. 2A, 2B and 2C can prevent the IOX article 10 from being amenable to measurement using prism coupling methods. Such a refractive index profile n(x) is referred to herein as a problematic refractive index profile. In particular, the surface portion PS of the problematic refractive index profile n(x) is what prevents the light 62F of the prism coupler system 28 from being properly coupled into enough of the guided modes of the IOX waveguide 22 to adequately sample the buried IOX region 20. Even if some light 62F is coupled into some of the guided modes, the light can only travel in the surface portion PS of the IOX waveguide 22, so that the mode spectrum 113 will typically lack the required contrast while also not providing any information about the deep portion PD of the buried IOX region 20.

In addition, a buried IOX region 20 having a relatively large depth of layer DL (e.g., DL>100 microns) allows the corresponding IOX waveguide 22 to support hundreds of guided modes so that the mode spectrum 113 has hundreds of TE and TM fringes 115TM and 115TE. This can overwhelm the photodetector system 130 and result in a blurry mode spectrum 113, which is unusable for an accurate determination of the stress profile CS(x) of the IOX region 20.

Aspects of the disclosure are directed to methods of overcoming the measurement limitations due to the problematic refractive index profile n(x) of the IOX article 10 by forming from the original IOX article a modified IOX article 10'. The modified IOX article 10' has a modified refractive index profile n'(x) wherein the surface portion PS of the IOX region 20 and the corresponding refractive index profile is altered so that a new maximum refractive index $n'_1$ falls at the surface 12 to define a new surface refractive index $n'_s$ (where $n'_s=n'_1$), while the deep portion DS of the IOX region 20 and the corresponding refractive index profile remains substantially the same. The modification of substantially only the surface portion PS of the IOX region 20 allows for prism coupling methods to be applied to the modified IOX article 10' while maintaining the general stress characteristics of most of the original IOX region 20. One or more stress characteristics of the original IOX article 10 are then determined (e.g., inferred) from the prism coupling measurements made on the modified IOX article 10' using the prism coupling system 28.

An example method includes performing an additional or modifying IOX process to the original IOX article 10. The modifying IOX process is directed to modifying the refractive index profile n(x) just enough to enhance the contrast of the mode spectrum 113 so that a sufficient number of fringes 115TM and 115TE of the mode spectrum can be measured using the prism coupler system 28, thereby allowing for the stress profile CS'(x) and/or other stress characteristics of the modified IOX article 10 to be measured. As noted above, the additional IOX process is performed in a manner that substantially only changes the problematic refractive index profile n(x) in the surface portion PS of the IOX region 20 while leaving the deep portion DS substantially unchanged.

Note that the modifying IOX process also modifies the stress profile as well, so that the discussion herein could be based on the stress profile rather than the refractive index profile. However, the discussion is based on the refractive index profile because the prism coupling measurements rely on measuring the refractive index profile from the mode spectrum, and then determining stress characteristics from the measured refractive index profile.

Figure 4A:
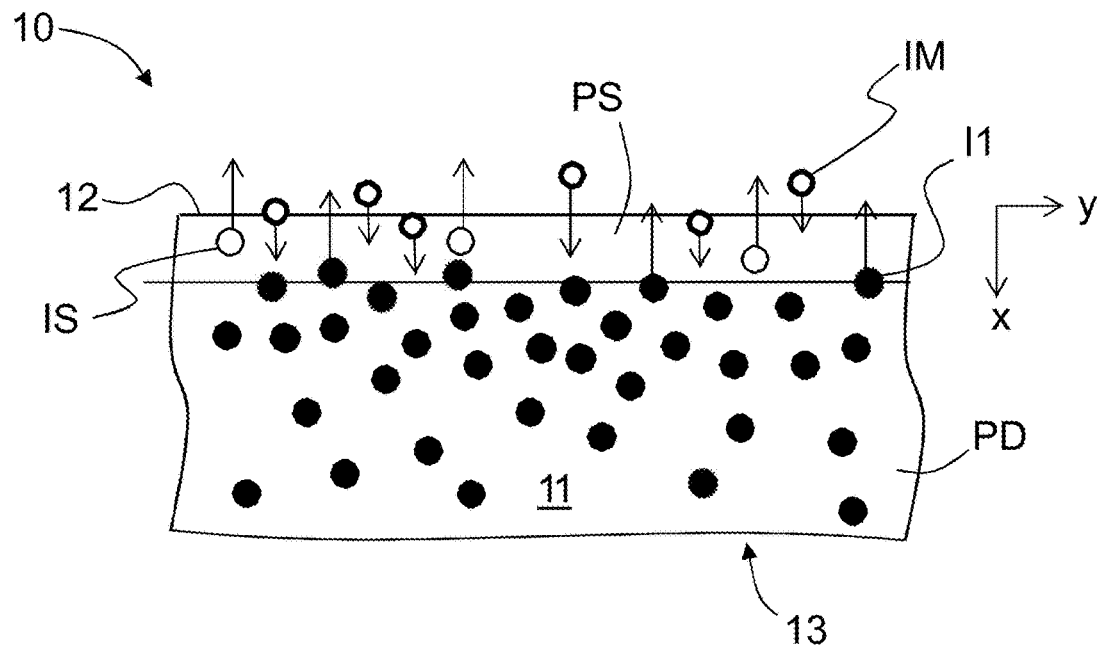
FIG. 4A is similar to FIG. 2A and shows a modifying IOX process used to change the refractive index profile of the surface portion of the IOX region of the IOX article so that a stress characteristic of the IOX article can be measured using the prism coupler system.

FIG. 4A is similar to FIG. 2A and shows an example modifying IOX process used to change the problematic refractive index profile n(x) of the surface portion PS of the IOX region to the modified refractive index profile n'(x) so that at least one stress characteristics of the IOX article 10 can be determined (e.g., inferred) from the mode spectrum 113 of the modified IOX article. In the modifying IOX process, a modifying ion IM is exchanged for matrix ions IS as well as for replacement ions I1 that were added to the glass-based matrix 11 during the first or original IOX process to form a new surface refractive index $n'_s$, wherein $n_s < n_1 < n'_s = n'_1$.

Figure 4B:
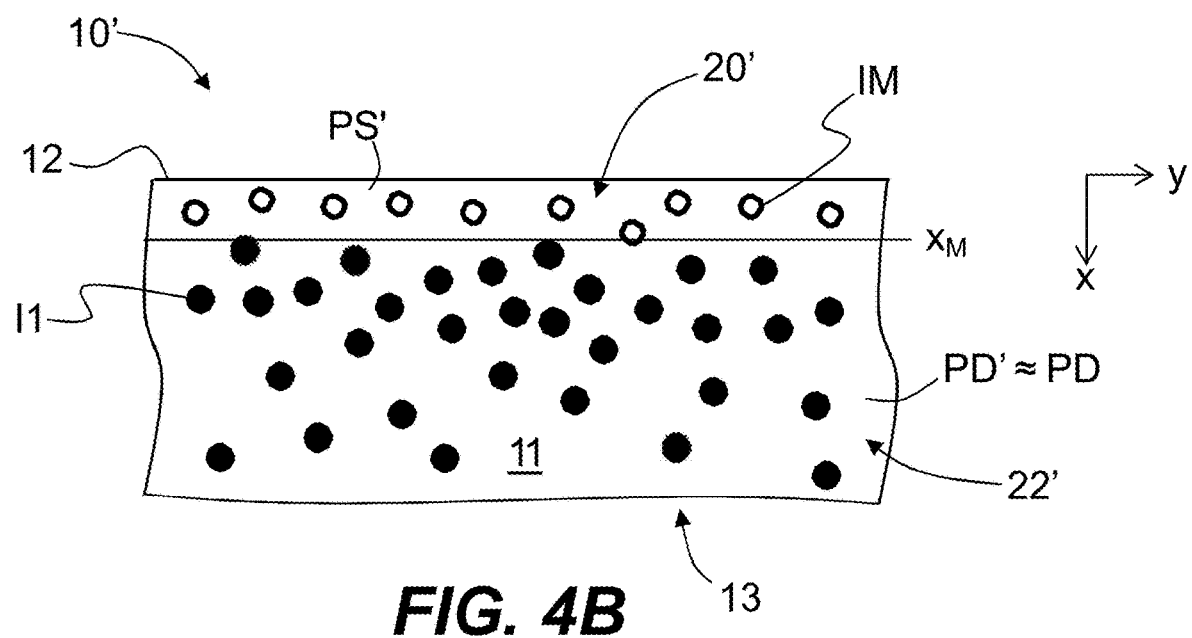
FIG. 4B is similar to FIG. 2B and shows the resulting modified IOX article that includes a modified IOX region that defines a modified IOX waveguide.
Figure 4C:
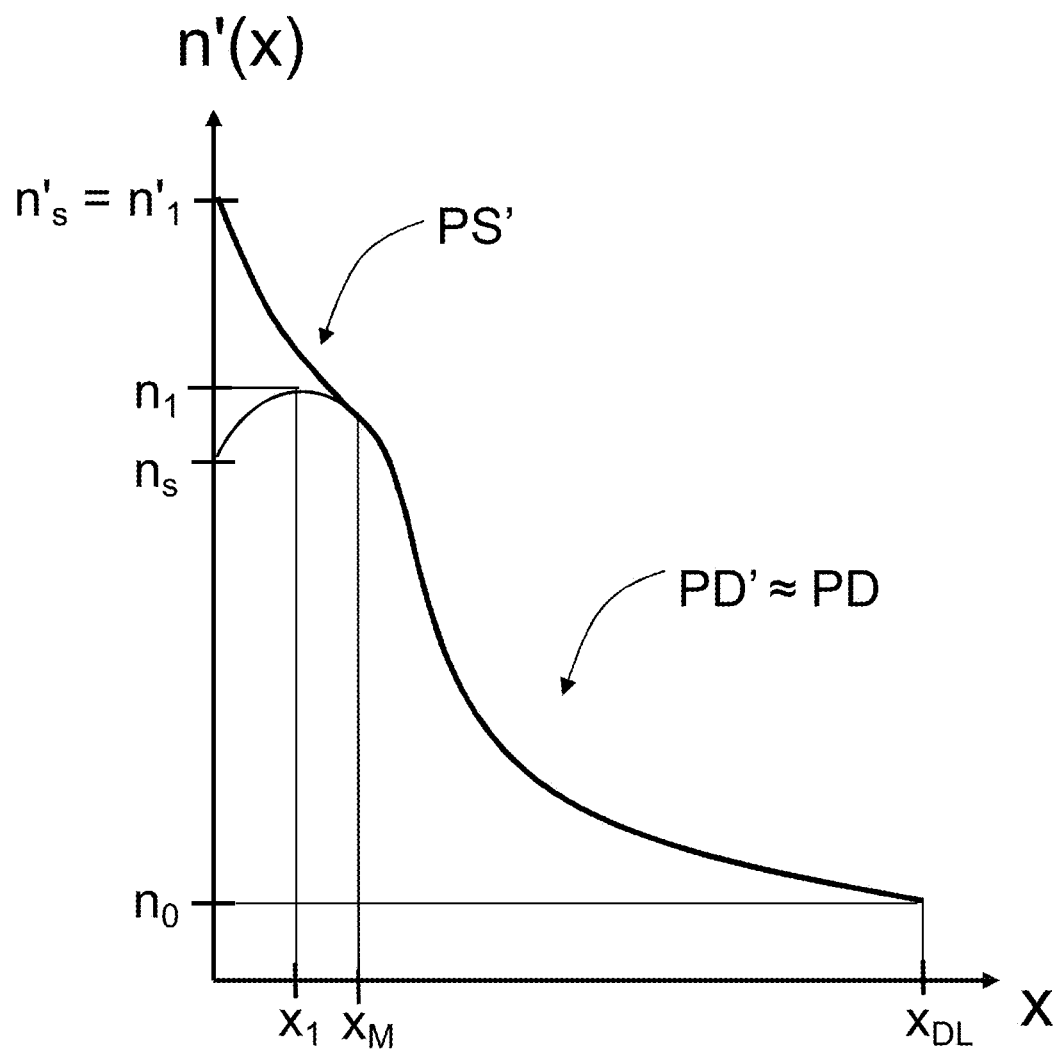
FIG. 4C is a refractive index plot similar to that of FIG. 2C but a modified refractive index profile n'(x) for the modified IOX region of FIG. 4B, showing how the modifying IOX process changes the surface portion of the refractive index profile without substantially changing the deep portion of the original refractive index profile.

FIG. 4B is similar to FIG. 2B and shows the resulting modified IOX article 10' that includes a modified IOX region 20' that defines a modified IOX waveguide 22'. FIG. 4C is a plot similar to that of FIG. 2C but of the modified refractive index n'(x) of the modified IOX region 20' of FIG. 4B. The problematic refractive index profile n(x) for the original surface portion PS is shown as a dashed line. The modified refractive index profile n'(x) is substantially the same as the original problematic refractive index profile n(x) of FIG. 2C in the deep portion DP but has the new (modified) maximum refractive index $n'_1$ at the surface 12 (i.e., at x=0) so that $n'_1=n'_s$, where $n'_s$ is a new (modified) surface refractive index.

The modified refractive index profile n'(x) differs from the problematic refractive index profile n(x) mainly if not exclusively in a modified surface portion PS' that resides immediately adjacent the surface 12 of the modified IOX article 10' and that extends into the glass-based matrix 11 by a modification distance $x_M$. Note that the modified refractive index profile n'(x) now decreases steadily from the surface 12 of the modified IOX article 10'. This feature is what enables a prism coupling measurement of the modified IOX waveguide 10' using the prism coupling system 28 since it allows the light 62F to couple into the full range of guided modes supported by the modified IOX waveguide 22' defined by the modified IOX region 20'.

The deep portion PD' of the modified refractive index profile n'(x) is substantially the same as the deep portion PD of the original refractive index profile n(x) of the original IOX region 20 (see FIG. 1D). The deep portion PD' of the modified IOX region 20' extends from the modification distance $x_M$ to the depth of layer distance $x_D$, and this deep portion remains substantially unaffected by the modifying IOX process, i.e., is substantially the same as the original deep portion PD.

In an example, $Ag^+$ is used as the modifying ion IM because it has a relatively high diffusivity and creates a relatively large refractive index change. These two characteristics of the modifying ion IM are desirable because they allow for a relatively fast modification of surface portion PS of original refractive index profile. This in turn prevents the deep portion PD of the problematic refractive index profile n(x) from changing substantially. In other examples, others modifying ions IM can be used, such as $Au^+$, $Rb^+$, $Cs^+$, and $Cu^+$.

Figure 5A:
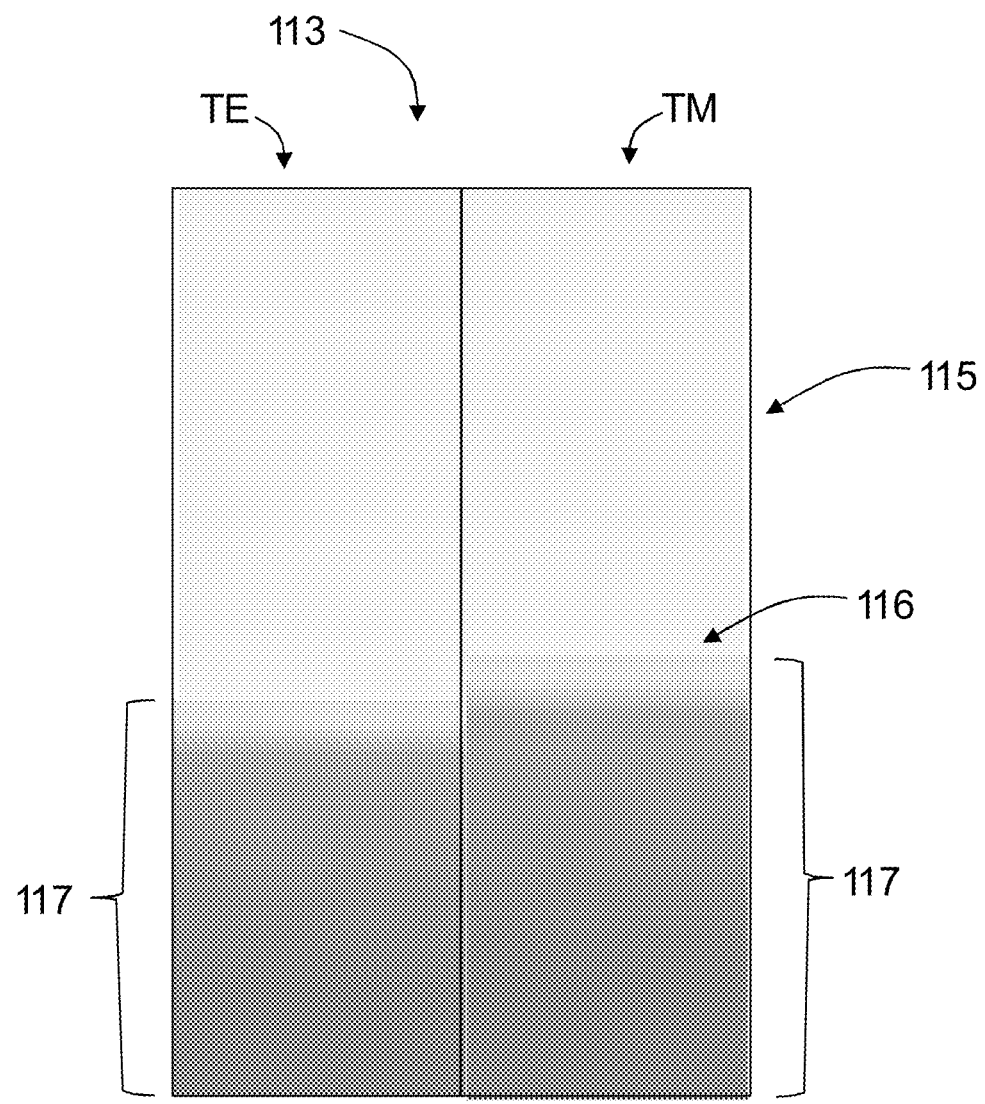
FIG. 5A is a depiction of an example mode spectrum similar to FIG. 3C for an original IOX article as captured by the prism coupling system of FIG. 3A, wherein the lack of TE and TM fringes and the low contrast at the TIR boundary indicate that the IOX article is not measurable using the prism coupling system.

With reference again to FIG. 3A, when the original IOX article 10 is measured in the prism coupling system 28, it results in the mode spectrum 113 as shown in FIG. 5A, where neither the TE or TM fringes 115E or 115M are visible while the TIR boundary 116 is blurred. Assuming the prism coupling system 28 is operating properly, this result leads one to conclude that the original IOX article 10 is unmeasurable using the prism coupling system 28.

At this point, the original IOX article 10 is removed and modified (box B1) to convert the original problematic IOX article 10 to the modified IOX article 10' as described above. Alternatively, the original IOX article 10 is removed and another IOX article from a set 10S of original IOX articles (e.g., all made the same way, such as in a common batch process during manufacturing) is sent to box B1 for modification.

Figure 5B:
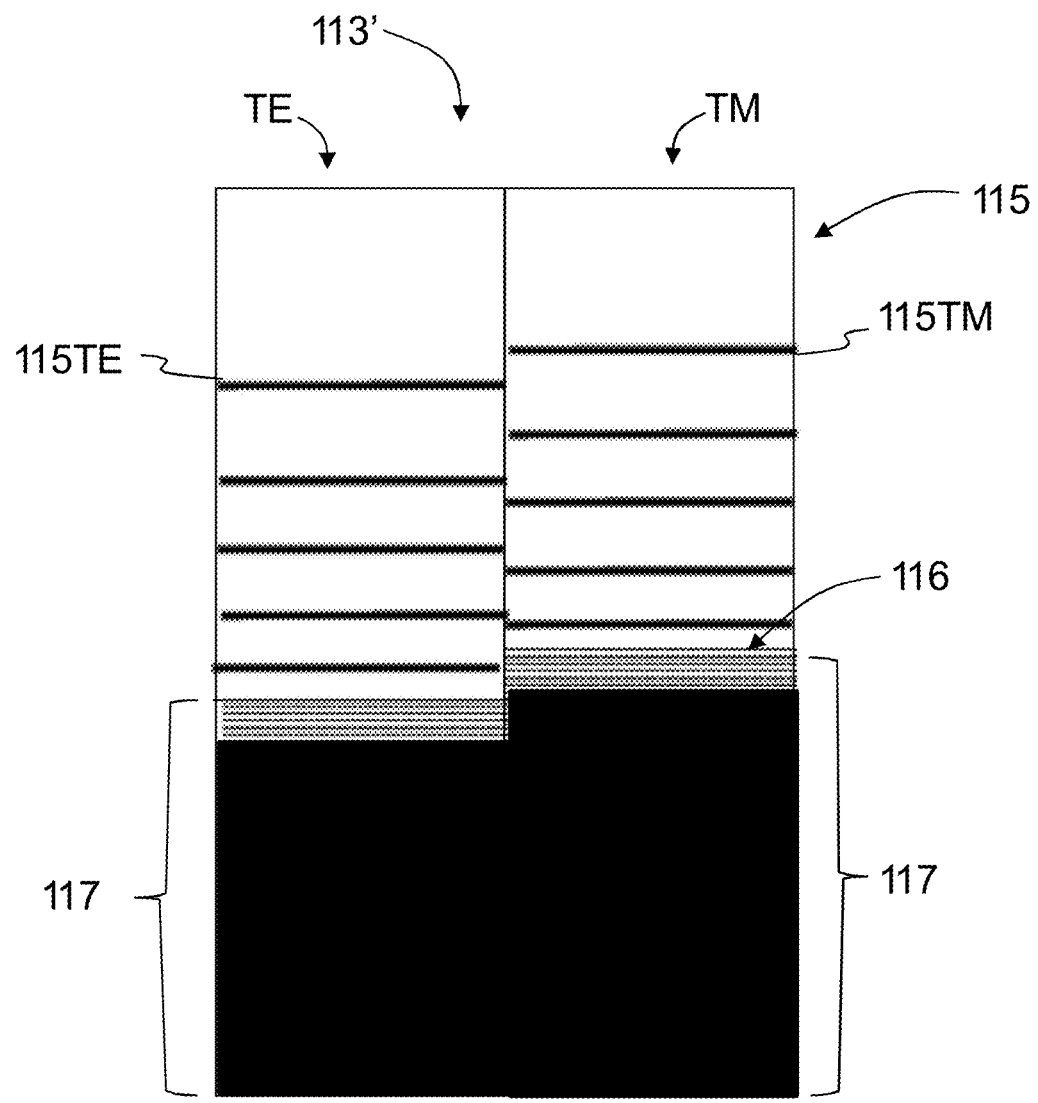
FIG. 5B is similar to FIG. 3C and is a depiction of a mode spectrum based on an actual measured mode spectrum for an example modified IOX article using the prism coupling system, wherein the TE and TM fringes in the TIR section and the few TE and TM fringes in the non-TIR section have relatively high contrast.

The resulting modified IOX article 10' is then provided to the support stage 30 for measurement by the prism coupling system 28. FIG. 5B is an example depiction of the resulting modified mode spectrum 113'. The modified mode spectrum 113' of FIG. 5B has TE and TM fringes 115TE and 115TM with relatively high contrast in the TIR section 115 and the non-TIR section 117.

The modified mode spectrum 113' is then used to determine at least one stress characteristic of the original IOX article 10. This is done by calculating the at least one stress characteristic for the modified IOX article 10' and then determining (e.g., inferring) the corresponding at least one stress characteristic for the original IOX article 10.

This is made possible because the deep portion DP of the original IOX region 20 remains substantially unchanged by the modifying IOX process, so that the stress measurement results for this region of the modified IOX article 10' are reasonably assumed to be substantially the same as that for the original IOX article 10. The stress measurement results for the modified surface portion PS of the modified IOX article 10' are not used directly since this surface portion has been changed to enable prism coupling methods to be employed. The stress characteristics of the surface portion PS of the original IOX waveguide 10 are obtained by extrapolation from the deep portion PD and by understanding how the modifying IOX process changes the refractive index profile and the stress characteristics of the original surface portion PS. This aspect of the measurement methods disclosed herein is explained further in the discussion below in connection with actual measurements performed on fabricated original and modified IOX articles.

Experimental Results

A glass-based substrate 13 made of a non-Li ion-exchangeable silicate glass material containing $Na_2O$ and having a thickness TH of 1.1 mm was subject to an initial or original IOX process using 100 wt % $KNO_3$ for 100 hours at 460° C. to form an original IOX article 10. The resulting problematic refractive index profile n(x) had the general form of FIG. 2C, with a depth of layer DL of about 200 μm. Attempts to measure the mode spectrum using the FSM-6000LE prism coupling system were unsuccessful because the fringes in the mode spectrum were blurred to the point of being unreadable, such as shown illustratively in FIG. 5A.

The original IOX article 10 was then subjected to the modifying IOX processes as described above using increasing concentrations of $Ag^+$ as the modifying ion IM. In the first modifying IOX process, the original IOX article 10 was treated in a salt bath of 99.950 wt % $KNO_3$ and 0.050 wt % $AgNO_3$ for 1 hr at 390° C. The resulting modified IOX article 10' was then put into the prism coupling system 28 and the mode spectrum 113 was measured. The mode spectrum 113 showed more clarity at the TIR boundary 116, but still no discernable fringes.

The concentration of $AgNO_3$ was then increased in the salt bath to 0.075 wt % and the IOX process was carried out on the original IOX article 10 for 1 hr at 390° C. The mode spectrum showed a clear TIR boundary 116 due the higher surface index $n_s$ and two TE and two TM mode fringes 115TE and 115TM in the TIR section 115 were just detectable by the prism coupling system. This allowed for a measurement of surface stress CS' of the modified IOX waveguide 10'.

The concentration of $AgNO_3$ was then increase again for three more modifying IOX processes that used 0.1 wt % $AgNO_3$, 0.3 wt % $AgNO_3$ and 0.5 wt % $AgNO_3$. With the increasing $AgNO_3$ concentrations, a large number of relatively high contrast closely spaced fringes 115TE and 115TM were observed in the modified mode spectrum 113', similar to the illustrative modified mode spectrum of FIG. 5B. This indicates that the light 62F was being coupled into not just the near-surface guided modes in the modified surface portion PS' of the modified IOX region 20' but also into guided modes that travel in the deep portion PD' of the modified IOX region. The experiments show that the $AgNO_3$ concentration can be in the range from 0.075 wt % to 1 wt % to accomplish the necessary modification of the problematic refractive index profile for the given IOX article 10.

Table 1 below is a summary of the prism coupling measurements made using the FSM-6000LE Surface Stress Meter on the various modified IOX articles 10' discussed above. The surface stress is denoted CS' and is measured in MPa.

TABLE 1

| X $AgNO_3$ (wt %) | Y $KNO_3$ (wt %) | CS' (MPa) |
| --- | --- | --- |
| 0 | 100 | 0 (not measurable) |
| 0.05 | 99.95 | 0 (not measurable) |
| 0.075 | 99.925 | 313.7 |
| 0.1 | 99.9 | 302.1 |
| 0.3 | 99.7 | 222.4 |
| 0.5 | 99.5 | 201.0 |

The stress optical coefficient (SOC) for the glass material used to form the original IOX article 10 was taken as $30.3 \times 10^{-7}$ (1/MPa). The data show that as the concentration of silver increases, the surface stress CS' decreases. This is expected, as the silver has a smaller ionic radius than the original in-diffused $K^+$ ion. Therefore, if one substitutes $Ag^+$ in the place of $K^+$ in the surface portion PS, a reduction in stress would occur for such non-Li glasses. In the case of Li-based glasses, this same stress reduction may not occur.

As noted above, when more than just two fringes in the mode spectrum can be detected, the stress profile CS'(x) of the modified IOX article 10' can be determined using the inverse WKB (IWKB) methods disclosed for example in the aforementioned U.S. Pat. No. 9,140,054.

In one example, the stress profile CS'(x) of the modified IOX article 10' is calculated using the following steps using the TM and TE guide mode spectrum 113' measured using standard prism coupling methods: a) digitally defining from the TM and TE mode spectra respective TM and TE intensity profiles corresponding to TM and TE guided modes; b) determining positions of intensity extrema of the TM and TE intensity profiles, and calculating respective TM and TE effective refractive indices from the positions; c) calculating TM and TE refractive index profiles $n_{TM}(x)$ and $n_{TE}(X)$ using the calculated effective refractive indices, which can be done by performing an inverse WKB calculation based on the TM and TE effective refractive indices or by fitting calculated TM and TE mode spectra to the measured TM and TE mode spectra using one or more respective assumed functions for $n_{TM}(x)$ and $n_{TE}(X)$; d) calculating the stress profile CS'(x)=[$n_{TM}$(x)−$n_{TE}$(x)]/SOC, where SOC is a stress optic coefficient for the glass substrate.

In another example, the stress profile CS'(x) of the modified IOX article 10' is calculated using the following steps using the TM and TE guide mode spectrum 113' measured using standard prism coupling methods: a) digitally capturing TM and TE mode spectra of the optical waveguide 22' of the modified IOX article 10'; b) determining positions of intensity extrema of the TM and TE mode spectra; c) calculating respective TM and TE effective refractive indices from the positions; d) calculating TM and TE refractive index profiles $n_{TM}$(x) and $n_{TE}$(X) from the effective refractive indices by either performing an inverse WKB calculation based on TM and TE effective refractive indices, respectively, or fitting calculated TM and TE mode spectra to the measured TM and TE mode spectra using one or more assumed functions for $n_{TM}$(x) and $n_{TE}$(X). The method further includes calculating the stress profile CS'(x)=[$n_{TM}$(x)−$n_{TE}$(x)]/SOC.

In another example, the stress profile CS'(x) of the modified IOX article 10' is calculated by the controller 150 of the prism coupling system 28, wherein the controller has instructions stored in a non-transitory computer-readable medium that cause the controller to carry out the following steps: a) determine positions of intensity extrema in the TM and TE mode spectra; b) calculate respective TM and TE effective refractive indices from the positions; c) calculate, from the TM and TE effective refractive indices, TM and TE refractive index profiles $n_{TM}$(x) and $n_{TE}$(X), where x is a distance from the surface 12, either by performing an inverse WKB calculation or by fitting calculated TM and TE mode spectra to the measured TM and TE mode spectra using one or more assumed functions for $n_{TM}$(x) and $n_{TE}$(x); and d) calculate the stress profile CS'(x)=[$n_{TM}$(x)−$n_{TE}$(x)]/SOC.

Figure 6A:
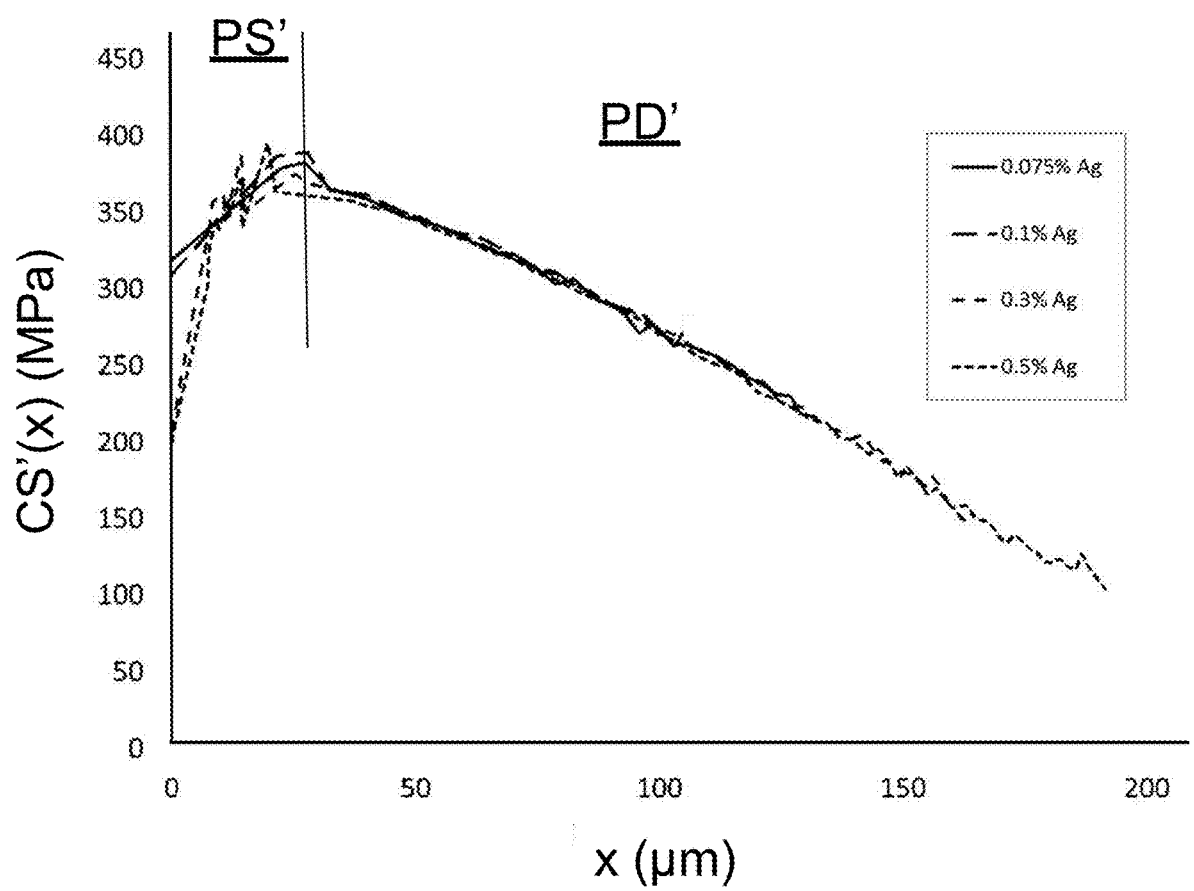
FIG. 6A is a plot of the stress profile CS'(x) (MPa) versus position x (m) as measured in an example modified IOX article formed from an original IOX article having a buried IOX region with a problematic refractive index profile and that was subjected to an Ag-based modifying IOX process using different Ag concentrations in an $AgNO_3/KNO_3$ salt bath.
Figure 6B:
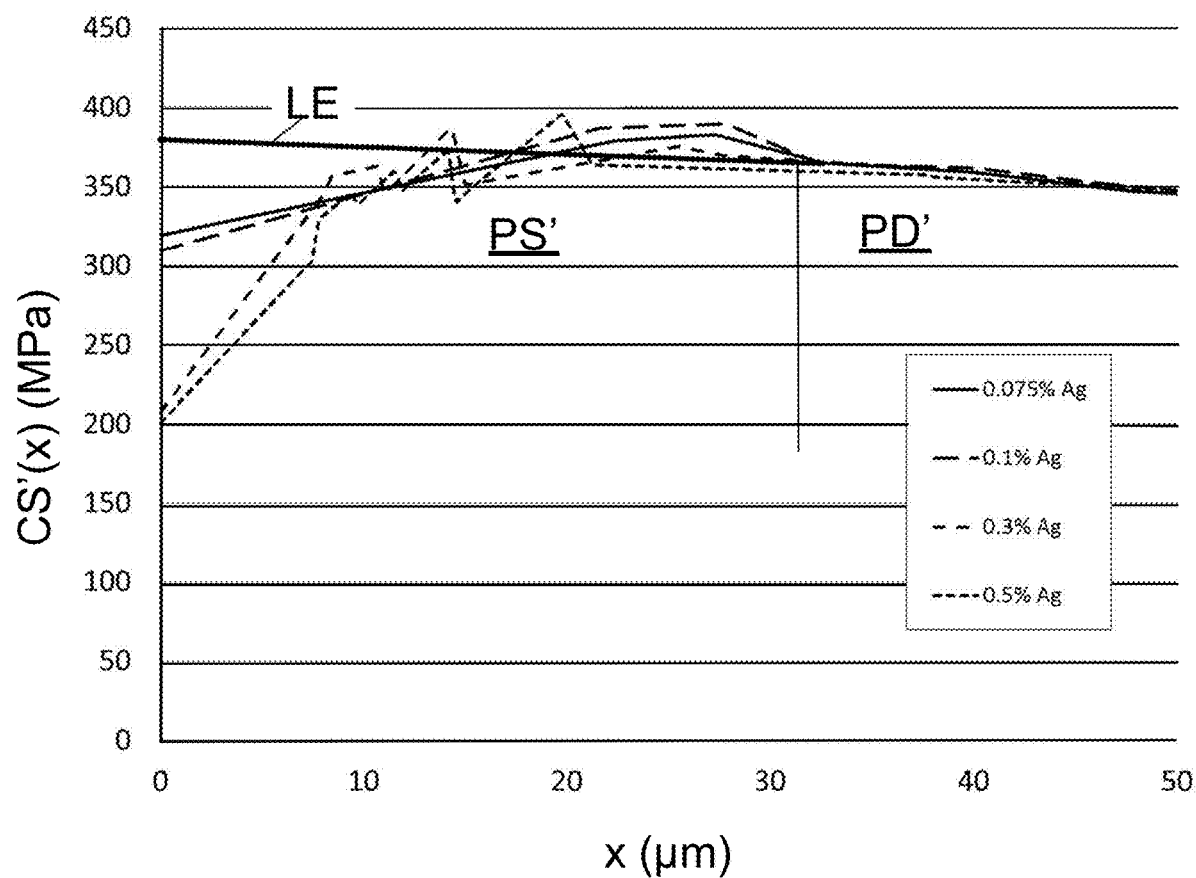
FIG. 6B is a close-up view of the portion of the plot of the modified stress profile CS'(x) of FIG. 6A from x=0 to x=50 m, including a linear extrapolation LE based on each of the Ag concentrations to provide an estimate of the surface stress CS (at x=0) of about 380 MPa for the original IOX article.

Once the stress profile CS'(x) of the modified IOX article 10' is determined, it can be used to determine one or more stress characteristics of the original IOX article 10. FIG. 6A is a plot of the stress profile CS'(x) (MPa) versus position x (µm) for example modified IOX articles 10' processed using the four different AgNO$_3$ concentrations of 0.075 wt %, 0.1 wt %, 0.3 wt % and 0.5 st %. FIG. 6B is a close-up view of the portion of the plot of FIG. 6A from x=0 to x=50 µm (i.e., the surface portion PS), and shows a linear extrapolation LE based on the deep portions DP of the curves for the different Ag concentrations. The linear extrapolation LE estimates the surface stress CS (i.e., CS(O)) of the original IOX region 20, i.e., as if the modifying Ag IOX process was not carried out on the modified IOX article.

Figure 6C:
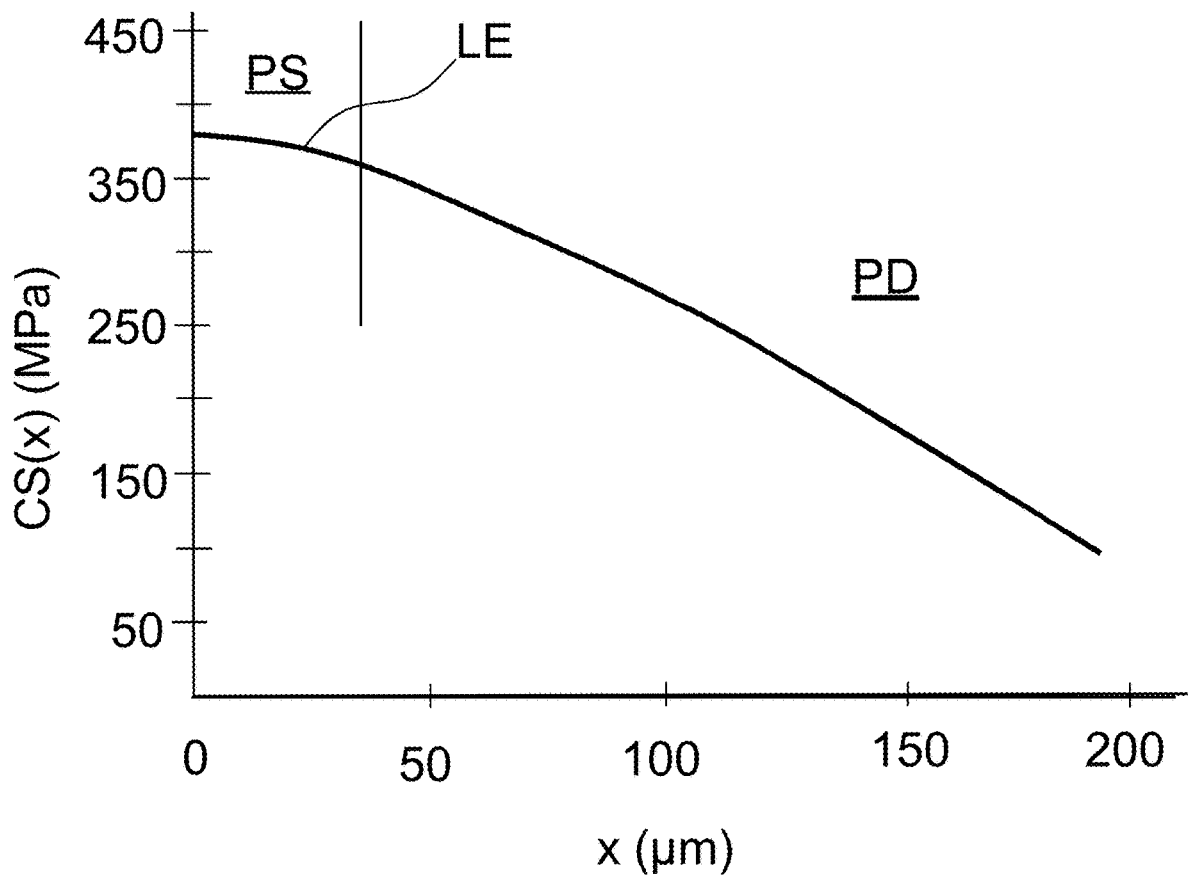
FIGS. 6C and 6D show the plots of FIGS. 6A and 6B respectively, but with just the extracted stress profile CS(x) of the original IOX article obtained by combining the stress profile CS'(x) of the deep portion of the modified IOX article (where CS'(x)=CS(x)) with the extrapolated portion (LE) of the stress profile CS'(x) that runs from the deep portion to the surface of the original IOX article.
Figure 6D:
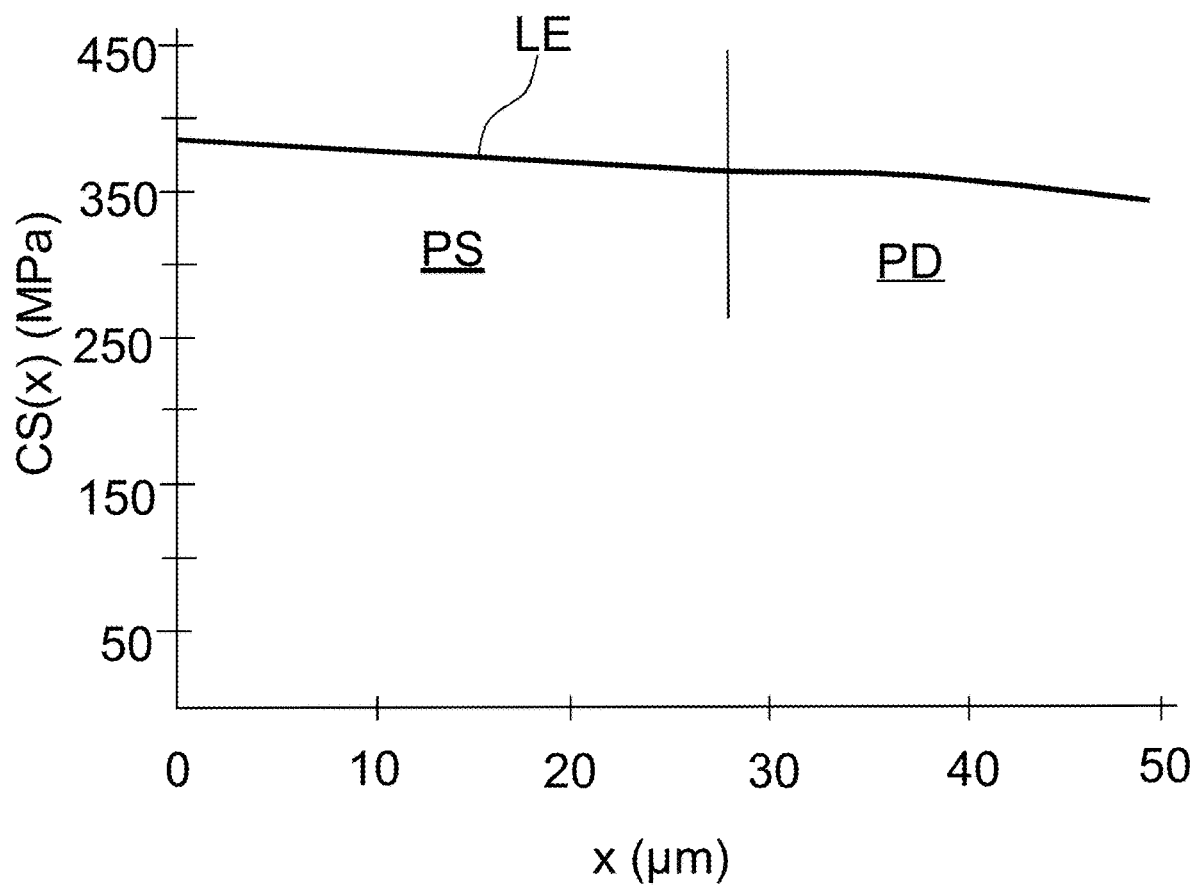

Thus, the stress profile CS(x) of the original IOX article 10 is taken as the portion of the stress profile CS'(x) of the modified IOX article 10' in the deep portion PD' (where CS'(x)=CS(x)) combined with the extrapolated portion of the stress profile CS'(x) from the deep portion to the surface 12. The stress profile CS(x) for the original IOX article 10 obtained in this manner is shown in isolation in the plots of FIGS. 6C and 6D for clarity.

As noted above, increasing the Ag concentration in the modifying IOX process reduces the stress in the surface portion PS, as can be seen in the plots of FIGS. 6A and 6B. In the limit as the Ag concentration approaches zero, the true surface stress CS of the original IOX article 10 is given by extending (extrapolating) the stress profile CS'(x) via the linear extrapolation LE from deep portion PD' through the surface portion PS' and to the surface 12 of the modified IOX article. The close-up view of FIG. 6B shows that the linear extrapolation LE gives a surface stress CS of about 380 MPa for the original IOX article 10 based on the given stress optic coefficient SOC for the glass.

The surface stress CS' of the modified IOX article 10' can be related to the surface stress CS of the original IOX article 10 by a surface stress conversion factor F, i.e., CS=F·CS'. For example, the surface stress CS' of the modified IOX article 10' from the plot of FIG. 6B is 200 MPa for an Ag concentration of 0.5 mole %. The corresponding extrapolated measurement of the surface stress CS for the original IOX article 10 is 380 MPa, which gives a surface stress conversion factor F=CS/CS'=380/200=1.9. For an Ag concentration of 0.1 mol %, the surface stress CS' is about 310 MPa so that the surface stress conversion factor F for this modified IOX process is F=CS/CS'=380/310=1.23.

Quality Control

The methods disclosed herein can be applied in various ways to perform quality control when manufacturing IOX articles 10. In one example, all of the original IOX articles 10 can be subjected to the modifying IOX exchange so that prism coupling measurements can be performed and the one or more stress characteristics measured. While this approach changes the surface stress, it insures that the IOX articles 10 are being manufactured to within select design and manufacturing tolerances consistent with desired chemical strengthening characteristics of the IOX articles. In an example, at least one measured stress characteristic is compared to at least one of a target value and a tolerance to ensure that the original IOX process used to form the IOX articles 10 yields the desired results. If the at least one measured stress characteristic is not equal to the target value and is outside of the tolerance, then the IOX process can be adjusted accordingly to bring the IOX articles 10 back into specification.

In another example, select IOX articles 10 taken from a set 10S of IOX articles 10 formed using the same IOX manufacturing process are subjected to the modifying IOX process and are then measured to infer one or more stress characteristics of the original IOX articles. The surface stress CS can be calculated using the relationship CS=F·CS', where as noted above the surface stress conversion factor F can be obtained from the stress measurements of the modified IOX article 10' as done in FIGS. 6A and 6B. The value of the surface stress conversion factor F will depend on the concentration of the modifying ion IM. When the modifying ion IM is silver, for non-Li glass, the surface stress conversion factor F>1. For Li-containing glasses or for a more complex modifying IOX process, the surface stress conversion factor can have a relative wide range of values and can also be less than 1.

The methods disclosed herein have the following advantageous features: 1) the ability to determine stress-related properties and characteristics of an IOX article that is not directly measurable using prism coupling systems and methods; 2) the ability to perform quality control when manufacturing IOX articles having problematic refractive index profiles; 3) applicability to a wide range of glass types typically used in IOX processing of substrates; 4) an antimicrobial property at the surface of the IOX article through the use of silver as a modifying ion; and 5) the depth of compression DOC can be measured in IOX articles with a deep depth of layer DL for which DOC>0.15·TH.

Frangibility

Frangible behavior or "frangibility" refers to specific fracture behavior when a glass-based article is subjected to an impact or insult. As utilized herein, a glass-based article (and in particular, a glass-based IOX article such as considered herein) is considered non-frangible when it exhibits at least one of the following in a test area as the result of a frangibility test: (1) four or less fragments with a largest dimension of at least 1 mm, and/or (2) the number of bifurcations is less than or equal to the number of crack branches. The fragments, bifurcations, and crack branches are counted based on any 2 inch by 2 inch square centered on the impact point. Thus, a glass-based article is considered non-frangible if it meets one or both of tests (1) and (2) for any 2 inch by 2 inch square centered on the impact point where the breakage is created according to the procedure described below.

In a frangibility test, an impact probe is brought into contact with the glass-based article, with the depth to which the impact probe extends into the glass-based article increasing in successive contact iterations. The step-wise increase in depth of the impact probe allows the flaw produced by the impact probe to reach the tension region while preventing the application of excessive external force that would prevent the accurate determination of the frangible behavior of the glass. Stated differently, the step-wise increase in depth approximates utilizing just sufficient force to reach the tension region and release the stored energy. In some embodiments, when just sufficient force is applied there is a slight delay between the force of the impact probe and the fracturing of the glass. In one embodiment, the depth of the impact probe in the glass may increase by about 5 m in each iteration, with the impact probe being removed from contact with the glass between each iteration. The test area is any 2 inch by 2 inch square centered at the impact point.

Figure 7A:
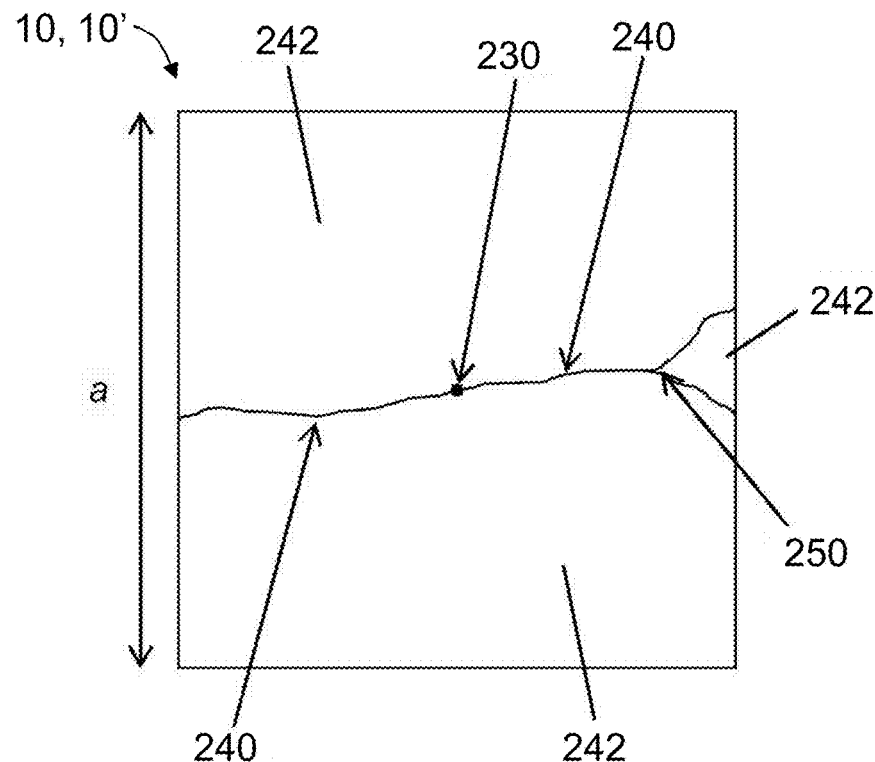
FIGS. 7A and 7B respectively depict a non-frangible and a frangible test result on two different example IOX articles as used herein.

FIG. 7A depicts a non-frangible test result on a test glass-based article in the form of an example IOX article 10 or 10'. As shown in FIG. 7A, the test area is a square that is centered at the impact point 230, where the length of a side of the square a is 2 inches. The non-frangible sample shown in FIG. 7A includes three fragments 242, and two crack branches 240 and a single bifurcation 250. Thus, the non-frangible IOX article 10 or 10' shown in FIG. 7A contains less than 4 fragments having a largest dimension of at least 1 mm and the number of bifurcations is less than or equal to the number of crack branches. As utilized herein, a crack branch originates at the impact point, and a fragment is considered to be within the test area if any part of the fragment extends into the test area.

While coatings, adhesive layers, and the like may be used in conjunction with the strengthened glass articles described herein, such external restraints are not used in determining the frangibility or frangible behavior of the glass-based articles. In some embodiments, a film that does not impact the fracture behavior of the glass-based article may be applied to the glass-based article prior to the frangibility test to prevent the ejection of fragments from the glass article, increasing safety for the person performing the test.

Figure 7B:
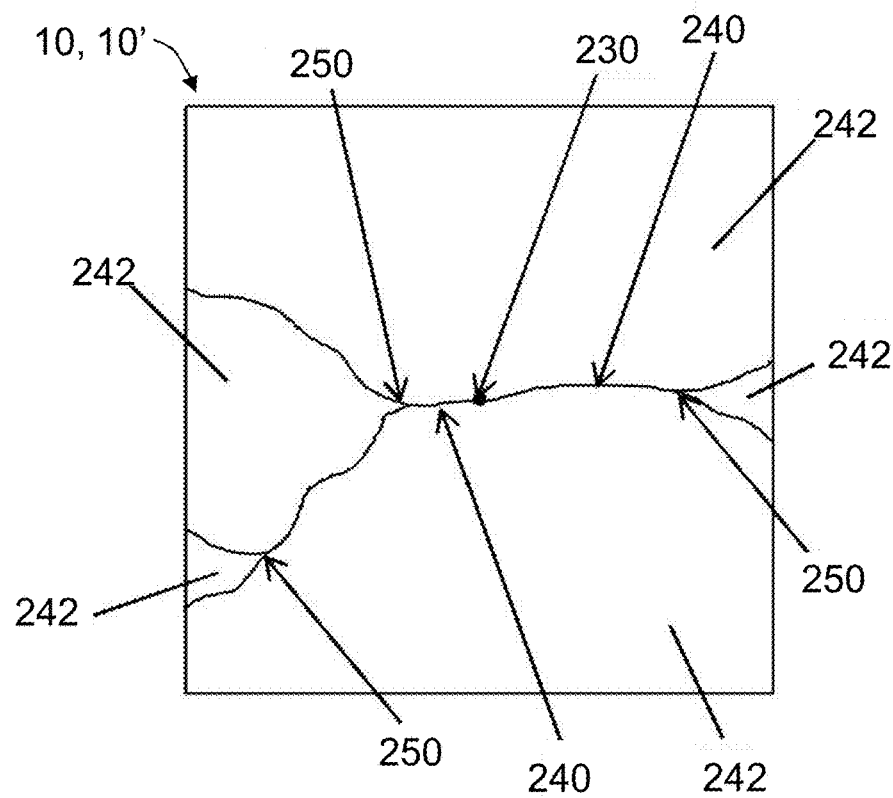

FIG. 7B depicts a frangible test result on a test glass article in the form of an example IOX article 10 or 10'. The frangible IOX article 10 or 10' includes 5 fragments 242 having a largest dimension of at least 1 mm. The IOX article 10 or 10' depicted in FIG. 7B includes 2 crack branches 240 and 3 bifurcations 250, producing more bifurcations than crack branches. Thus, the sample depicted in FIG. 7B does not exhibit either four or less fragments or the number of bifurcations being less than or equal to the number of crack branches.

In the frangibility test described herein, the impact is delivered to the surface of the glass-based article with a force that is just sufficient to release the internally stored energy present within the strengthened glass-based article. That is, the point impact force is sufficient to create at least one new crack at the surface of the strengthened glass-based article and extend the crack through the compressive stress CS region (i.e., depth of layer) into the region that is under central tension CT.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of determining at least one stress characteristic of an original ion-exchanged (IOX) article having a surface and a buried IOX region, the buried IOX region having a buried refractive index profile that prevents the original IOX article from being measured using a prism coupler system, the method comprising:
    a) modifying the buried IOX region of the original IOX article in a surface portion of the buried IOX region to form a modified IOX article having an unburied refractive index profile that allows the modified IOX article to be measured using a prism coupler;
    b) measuring a mode spectrum of the modified IOX article using the prism coupler system; and
    c) determining the at least one stress characteristic of the original IOX article from the mode spectrum of the modified IOX article.

2. The method according to claim 1, wherein c) comprises:
    calculating a stress profile using the mode spectrum; and
    determining the at least one stress characteristic of the original IOX article from the stress profile of the modified IOX article.

3. The method according to claim 2, wherein the at least one stress characteristic comprises a surface stress, and wherein c) comprises extrapolating the stress profile through the surface portion and to the surface of the original IOX article to estimate the surface stress of the original IOX article having the buried refractive index profile.

4. The method according to claim 1, wherein the at least one stress characteristic is selected from the group of stress characteristics comprising: a surface compressive stress, a birefringence, a compressive stress profile, a center tension, and a depth of compression.

5. The method according to claim 1, wherein the original IOX article and the modified IOX article are frangible.

6. The method according to claim 1, wherein the original IOX article and the modified IOX article are non-frangible.

7. The method according to claim 1, wherein the original IOX article has a thickness TH in a range of 50 microns to 2000 microns.

8. The method according to claim 7, wherein the original IOX article has a depth of compression DOC>0.15·TH.

9. The method according to claim 1, wherein the modifying of the buried IOX region comprises performing a modifying IOX process.

10. The method according to claim 9, wherein the modifying IOX process uses an in-diffusing ion selected from the group of ions comprising: $Ag^+$, $Au^+$, $Rb^+$, $Cs^+$, and $Cu^+$.

11. The method according to claim 9, wherein the modifying IOX process comprises immersing the original IOX article in a solution containing $AgNO_3$, wherein the $AgNO_3$ has a concentration in the solution the range from 0.075 wt % to 1 wt %.

12. The method according to claim 1, wherein the original IOX article comprises an aluminosilicate glass or a borosilicate glass.

13. The method according to claim 1, wherein the buried IOX region has a depth of layer DL greater than 100 microns.

14. The method according to claim 13, wherein the surface portion of the buried IOX region extends into the original IOX article from the surface to a depth $D_{PS}$, wherein $(0.05) \cdot DL \leq D_{PS} \leq (0.5) \cdot DL$.

15. The method according to claim 1, wherein the buried IOX region has maximum refractive index that resides below the surface at a first depth, and wherein the surface portion of the buried IOX region extends to at least the first depth.

16. The method according to claim 1, wherein the buried IOX region is formed using either a $K^+$—$Na^+$ IOX process or a $K^+$—$Li^+$ IOX process.

17. A method of determining at least a surface stress CS of an ion-exchanged (IOX) article having a surface and a buried IOX region, the buried IOX region having a buried refractive index profile that prevents the IOX article from being measured using a prism coupler system, the method comprising:
 a) modifying the buried IOX region in a surface portion of the buried IOX region by performing a modifying IOX process while leaving a deep portion of the buried IOX region substantially unchanged to define an unburied refractive index profile having a modified surface stress CS' different than the surface stress CS but that allows the IOX article to be measured using a prism coupler;
 b) measuring a compressive stress profile of the IOX article as modified in a) using the prism coupler system; and
 c) extrapolating the measured stress profile for the deep portion of the buried IOX region through the surface portion of the buried IOX region and to the surface of the IOX article to determine the surface stress CS.

18. The method according to claim 17, wherein the IOX article is frangible.

19. The method according to claim 17, wherein the IOX article is non-frangible.

20. The method according to claim 17, wherein the IOX article has a thickness TH in a range of 50 microns to 2000 microns.

21. The method according to claim 20, wherein the IOX article has a depth of compression $DOC > 0.15 \cdot TH$.

22. The method according to claim 17, wherein the modifying IOX process comprises immersing the IOX article in a molten solution containing $AgNO_3$, wherein the $AgNO_3$ has a concentration in the molten solution the range from 0.075 wt % to 1 wt %.

23. The method according to claim 17, wherein the IOX article comprises an aluminosilicate glass or a borosilicate glass.

24. The method according to claim 17, wherein the buried IOX region has a depth of layer DL greater than 100 microns, and wherein the surface portion of the buried IOX region extends into the IOX article from the surface to a depth $D_{PS}$, wherein $(0.05) \cdot DL \leq D_{PS} \leq (0.5) \cdot DL$.

25. The method according to claim 17, wherein the buried IOX region is formed using either a $K^+$—$Na^+$ IOX process or a $K^+$—$Li^+$ IOX process.

26. The method according to claim 17, further including determining the surface stress CS from a measurement of the modified surface stress CS' via a relationship $CS = F \cdot CS'$, where F is a surface stress conversion factor.

27. A quality control method for making an ion-exchanged (IOX) article having a surface and a buried IOX region, the buried IOX region having a buried refractive index profile that prevents the IOX article from being measured using a prism coupler system, the method comprising:
 a) selecting the IOX article from a set of IOX articles formed using a common IOX process;
 b) modifying the buried IOX region of the selected IOX article in a surface portion of the buried IOX region to define an unburied refractive index profile that allows the IOX article to be measured using the prism coupler;
 c) measuring a mode spectrum of the selected IOX article as modified in b) using the prism coupler system;
 d) determining from the mode spectrum at least one stress characteristic of the selected IOX article as modified in b); and
 e) comparing the determined at least one stress characteristic to at least one of a target value and a tolerance for the at least one stress characteristic.

28. The method according to claim 27, wherein the at least one stress characteristic is selected from the group of stress characteristics comprising: a surface compressive stress, a birefringence, a compressive stress profile, a center tension, and a depth of compression.

29. The method according to claim 27, wherein d) comprises:
 calculating a stress profile using the mode spectrum; and
 determining the at least one stress characteristic from the stress profile.

30. The method according to claim 27, wherein in the IOX article is frangible.

31. The method according to claim 27, wherein in the IOX article is non-frangible.

32. The method according to claim 27, wherein the IOX article has a thickness TH in a range of 50 microns to 2000 microns.

33. The method according to claim 32 wherein the IOX article has a depth of compression $DOC > 0.15 \cdot TH$.

* * * * *